United States Patent [19]

Plate

[11] Patent Number: 5,394,583
[45] Date of Patent: Mar. 7, 1995

[54] SELF-LOADING RAMP FOR A WHEELED VEHICLE

[75] Inventor: Craig Plate, Pella, Iowa

[73] Assignee: Vermeer Manufacturing Company, Pella, Iowa

[21] Appl. No.: 121,877

[22] Filed: Sep. 17, 1993

[51] Int. Cl.⁶ .............................................. E01D 1/00
[52] U.S. Cl. ..................................... 14/69.5; 14/71.1; 414/400; 414/538
[58] Field of Search ................. 14/69.5, 70, 71.1, 71.3, 14/71.5, 71.7, 72.5; 414/400, 478, 479, 480, 500, 494, 538, 572

[56] References Cited
U.S. PATENT DOCUMENTS
4,715,769 12/1987 Kirtley ................................. 414/571

Primary Examiner—Ramon S. Britts
Assistant Examiner—Pamela A. O'Connor
Attorney, Agent, or Firm—Merchant, Gould, Smith, Edell, Welter & Schmidt

[57] ABSTRACT

A ramp for loading and unloading vehicles includes an elevated track assembly. A ramp assembly is mounted on the track assembly. The ramp has wheel support surfaces extending substantially an entire length of the ramp. A movable track is carried on the track assembly with the track extending a length of the assembly. The ramp is coupled to the track for the ramp to be urged by the track to slide on the assembly.

3 Claims, 4 Drawing Sheets

SELF-LOADING RAMP FOR A WHEELED VEHICLE

BACKGROUND OF THE INVENTION

The invention relates generally to ramps for loading and unloading wheeled vehicles and, more particularly, to a self-loading ramp which is mounted on a truck or the like to assist in loading and unloading a vehicle to be transported by the truck.

Wheeled vehicles that are unsuited for self-transport between work sites on traveled roadways are in very wide and common use. Such vehicles are particularly common in the industries of agriculture, construction, earth working, and materials handling. These vehicles typically are used in relatively close proximity to a particular work site and then must be transported by independent means to remote work sites. The applications of these vehicles require only slow ground transport speeds or the wheeled vehicles are not self-propelled at all. Accordingly, independent means is required to transport such vehicles from work site to work site. Since the transport means typically have transport beds which are elevated above the surface of the ground, the vehicle to be transported must be raised from its ground-supported position at ground level to the level of the bed. While ramps are commonly used for this purpose, known ramps require manual manipulation from stored to operating positions and do not provide powered assist in the vehicle loading operation.

SUMMARY OF THE INVENTION

The invention consists of a self-powered ramp mounted on the bed of a transport vehicle and which moves a ramp between a storage and operating position therefor.

The self-loading ramp consists of two principal sub-units or assemblies. A stationary track assembly is secured to the bed of the transport vehicle. A ramp assembly is supported on the stationary assembly for movement between a storage position overlying the stationary assembly and an operating position extended outwardly and downwardly from a rearward end portion of the stationary assembly. Relative movement of the assemblies is accomplished through a pair of endless chains powered by a first motor that is mounted on the stationary track assembly. When the ramp assembly is in its operating position, a second motor is used to assist in the transport of the wheeled vehicle from its ground-supported position to a ramp-loaded position on the ramp assembly. After the wheeled vehicle has been loaded on the ramp assembly, the first motor is used to raise the ramp assembly from its downwardly extended position to its storage position overlying the stationary track assembly. When off-loading the wheeled vehicle, the second motor can be used to assist in the controlled transport of the wheeled vehicle down the ramp assembly.

An object of the invention is to provide a self-powered vehicle loading ramp mounted on the bed of a road transport vehicle for the powered movement of a ramp on which is mounted a wheeled vehicle to be transported from the ramp working position to the ramp and vehicle storage position.

Another object of the invention is to provide a self-powered ramp which assists in the movement of a wheeled vehicle to be transported between a ground-supported position and a raised position on the ramp.

These and other objects of the invention will be made clear to a person skilled in the art upon a review of this specification, the associated drawings, and the appended claims.

BRIEF DESCRIPTION OF THE DRAWINGS

FIG. 3 is a detail perspective of a self-closing latch assembly for holding a wheeled vehicle on a ramp of the invention.

FIGS. 4a and 4b are cross-sectional views of the latch assembly taken along line 4—4 of FIG. 3 and showing jaws of the latch assembly in a closed position and an open position thereof

DETAILED DESCRIPTION OF A PREFERRED EMBODIMENT

Figure 1:
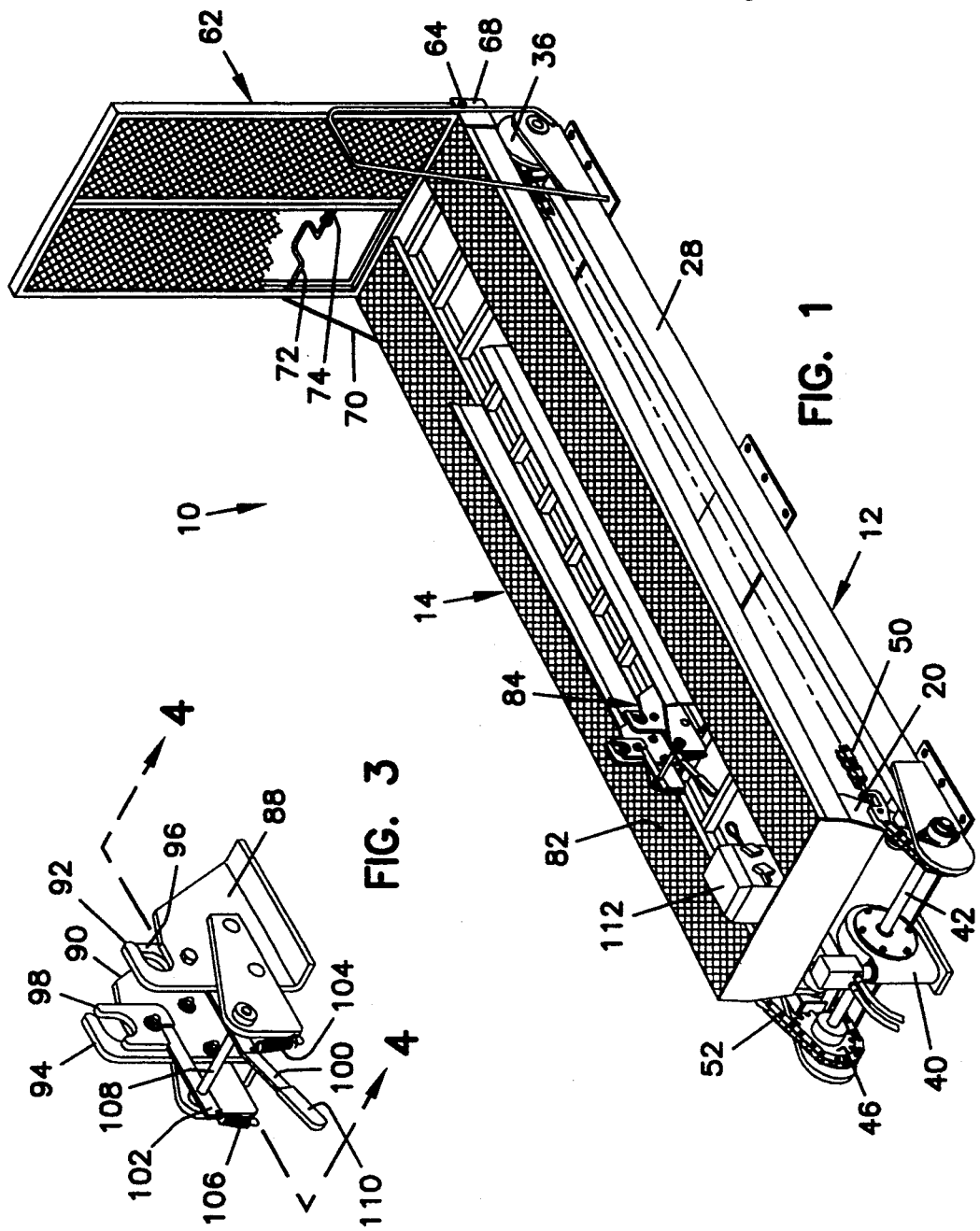
FIG. 1 is a perspective view of the invention in a storage position thereof.
Figure 2:
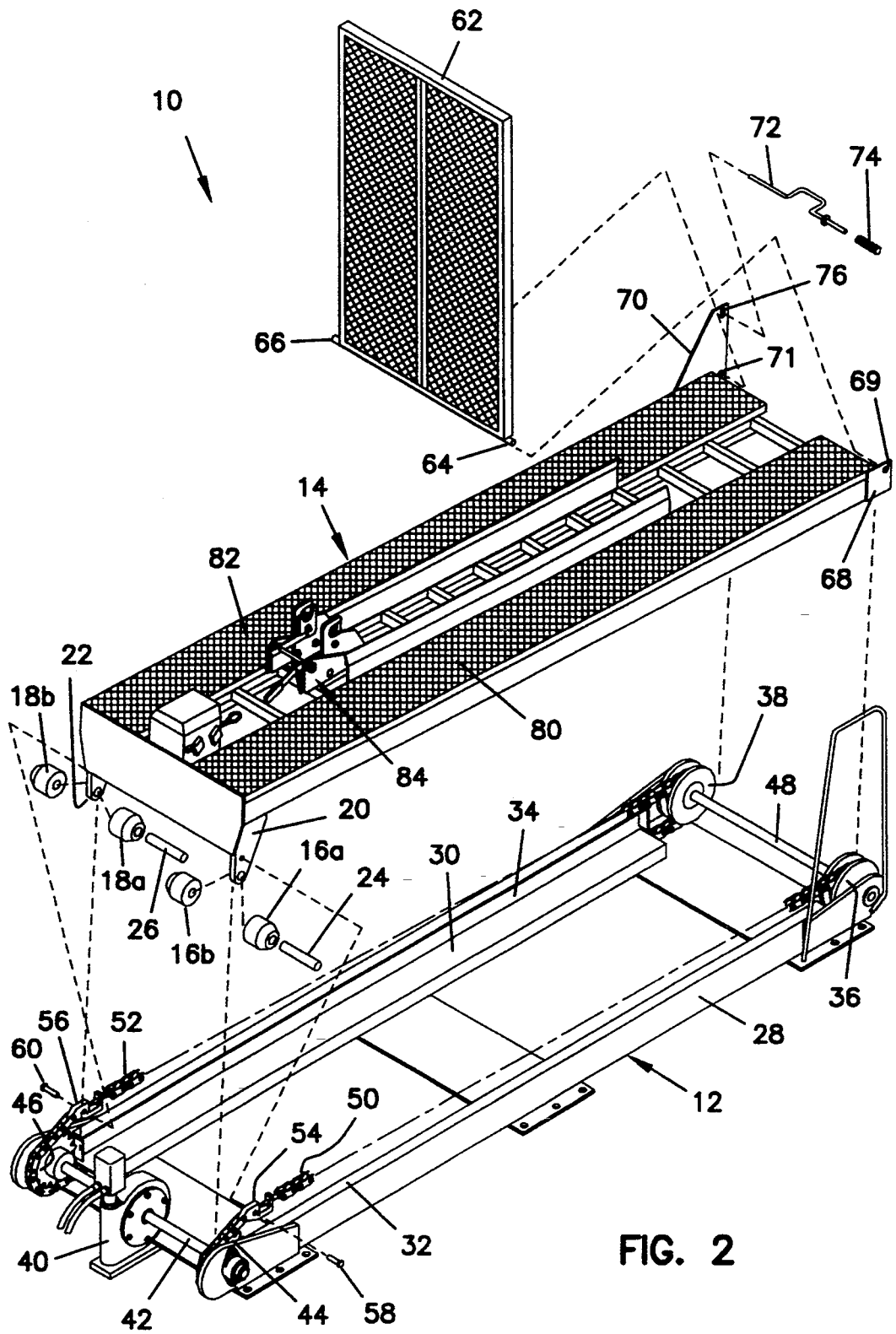
FIG. 2 is an exploded perspective view corresponding to FIG. 1.
Figure 5:
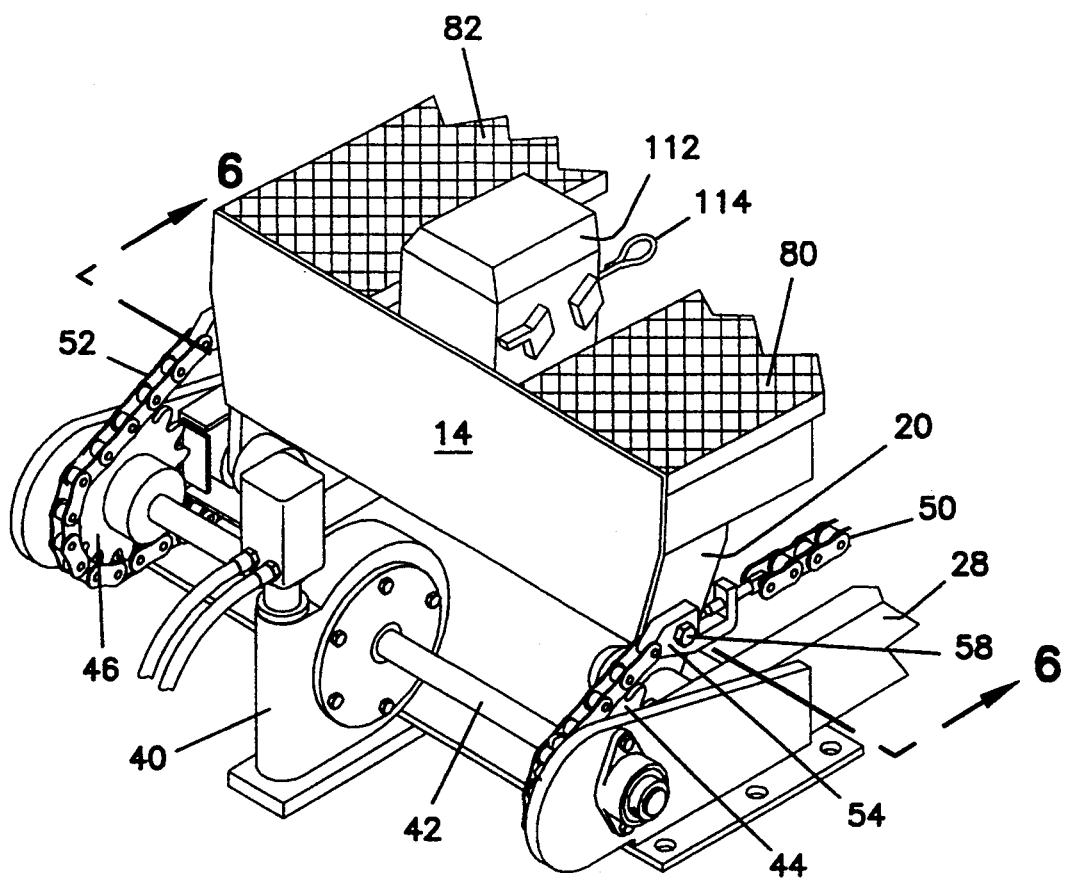
FIG. 5 is an enlarged detail view of the forward end of the invention showing a first motor and chain drive of the invention.
Figure 6:
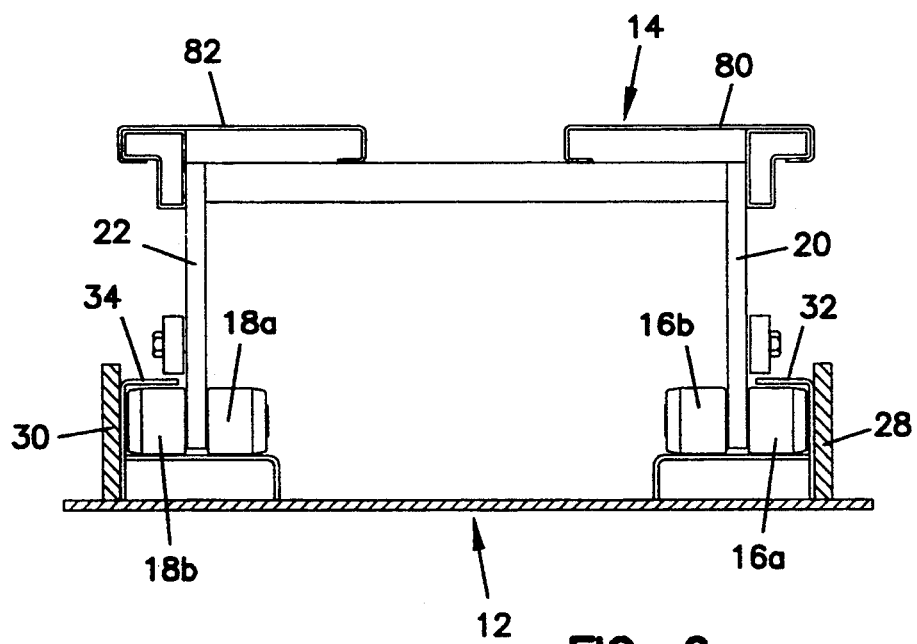
FIG. 6 is a cross-sectional view taken along line 6—6 of FIG. 5 and showing the connection between a stationary assembly of the invention and a ramp assembly of the invention for providing movement of the ramp assembly relative to the stationary assembly.

Referring to FIGS. 1 and 2, there is illustrated, generally at 10, a self-loading ramp of the present invention. The self-loading ramp 10 includes a stationary assembly 12 and a ramp assembly 14 which are substantially coextensive in length. The ramp assembly 14 is mounted for rolling movement longitudinally of the stationary assembly 12 by means of two pairs of rollers 16a and 16b and 18a and 18b which are mounted for rotational movement on a corresponding one of a pair of downwardly extending roller mounts 20 and 22 with coacting axle pins 24 and 26, respectively. The rollers 16 and 18 ride on corresponding one of a pair of rails 28 and 30 that are located on opposite sides of the stationary assembly 12 (FIGS. 2 and 6). Vertical motion of the rollers 16 and 18, and accordingly the forward end portion of the ramp assembly 14, is limited by a pair of inwardly extended flanges 32 and 34 that are associated with opposite sides of the stationary assembly 12 and which are spaced above a corresponding one of the rails 28 and 30 by a distance that is only a little greater than the diameter of the rollers 16 and 18.

Relative longitudinal movement between the ramp assembly 14 and the stationary assembly 12 is further assisted by a pair of idler pulleys 36 and 38 that are mounted for rotation on the rearward end portion of the stationary assembly 12 (FIG. 2). The bottom surface of the ramp assembly 14 is supported on the idler rollers 36 and 38. As will be explained more fully below, during movement of the ramp assembly 14, a drive assembly of the invention will rotate the idler wheels 36 and 38 in a cooperating direction to thereby assist the relative longitudinal movement of the ramp assembly 14.

The stationary assembly 12 includes an endless chain drive comprised of an hydraulic motor 40, a drive shaft 42 and associated drive sprockets 44 and 46, an idler shaft 48 with its associated idler pulleys 36 and 38, and two endless chains 50 and 52. As best illustrated in FIG. 2, the endless chain 50 is entrained about drive sprocket 44 and idler pulley 36 extending along a side of the stationary assembly 12 with the lower run of the endless chain 50 passing under the rail 28. Correspondingly, endless chain 52 is entrained about drive sprocket 36 and idler pulley 38 along the opposite side of the stationary assembly 12 and having its lower run passing underneath the rail 30. Accordingly, rotation of the motor 40 in a first direction will result in coordinated movement of the endless chains 50 and 52 in a first direction, and rotation of the motor 40 in a second, opposite direction will result in coordinated movement of the endless chains 50 and 52 in the opposite direction.

A link member 54 is provided in the endless chain 50 and is positioned transversely opposite to a corresponding link member 56 of the endless chain 52. Each of the links 54 and 56 are attached to a corresponding one of the downwardly extended ears 20 and 22 of the ramp assembly 14 and secured thereto by a bolt 58, 60, respectively. Accordingly, rotation of the motor 40 in a first direction will move the endless chains 50 and 52 to result in longitudinal movement of the ramp assembly 14 from the position illustrated in FIG. 1 in the rearward direction so as to extend the rearward end portion of the ramp assembly 14 away from the stationary assembly 12. From an extended or rearward position, rotation of the motor 40 in a second, opposite direction will retract the ramp assembly 14 toward the home or storage position of FIG. 1.

A ramp extension 62 is pivotally mounted at the rearward end portion of the ramp assembly 14 by way of a pair of integral, outwardly projected pins 64 and 66 which are pivotally mounted to a pair of mounting plates 68 and 70 where they are received in a corresponding one of a pair of holes 69 and 71. The ramp extension 62 is held in an upright, storage position therefor by a handle 72 that is urged into a latched position therefor by an associated spring 74, wherein the end portion of the handle 72 opposite the spring 74 is received in an opening 76 of the mounting plate 70.

The ramp assembly 14 is provided with a pair of transversely spaced, longitudinal tracks 80 and 82 that are substantially coextensive in length with and arranged on either side of the longitudinal center line of the ramp assembly 14.

A self-closing latch assembly 84 is mounted to the ramp assembly 14 between the tracks 80 and 82. The latch assembly 84 is adapted for releasable attachment to an axle or other transverse structural element of a vehicle to be pulled up the ramp assembly 14. A pair of side members 88 and 90 include at their upper portions a stationary latch member 92 and 94, respectively, that is open in the rearward direction (FIGS. 3 and 4). One each of a pair of pivoting latch members 96 and 98 are mounted on a corresponding one of the side members 88 and 90 for pivotable movement about a point located below the corresponding stationary latch member 92, 94. The pivoting latch members 96 and 98 are pivotable between an open position, as illustrated in FIG. 4b, and a closed position, as illustrated in FIG. 4a. When in the open position, as an axle or other transverse structural member 86 (FIG. 4a) of the wheeled vehicle is brought into contact with the self-closing latch assembly 84, the pivoting latch members 96 and 98 will be contacted and pivoted upon further movement of the transverse structural member 86 to the closed position wherein the transverse structural member 86 is captured in the latch assembly 84. The pivoting latch members 96 and 98 are releasably held in the closed or latched position by a corresponding one of a pair of keeper bars 100 and 102 that are biased to the latched position by a pair of springs 104 and 106. The keeper bars 100 and 102 are connected by a cross bar 108 so as to pivot as a unit. The keeper bar 102 is provided with a handle end portion 110 which is raised upwardly by an operator against the springs 104 and 106 to release the pivoting latch members 96 and 98 and thereby allow the release of the transverse structural member 86. An electric winch 112 is mounted at the forward end portion of the ramp assembly 14 and includes a cable 114 which can be attached to the axle 86. The winch 112 is then used, as will be described in more detail below, to power assist the movement of a wheeled vehicle between a ground-supported position and a loading position on the ramp assembly 14.

Figure 7A:
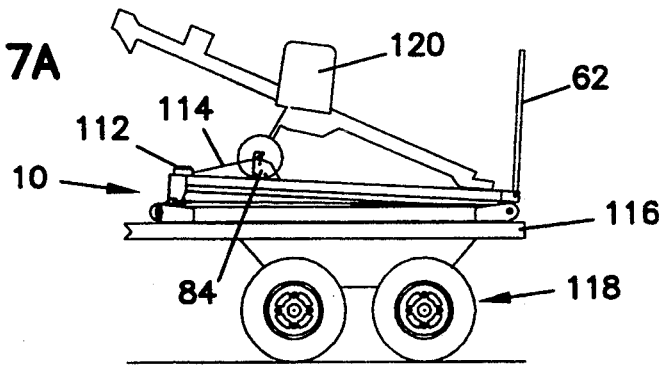
FIGS. 7a–d are side schematic views of the invention mounted on a transport vehicle and showing movement of the ramp assembly and a supported wheeled vehicle from a transport position of the wheeled vehicle to an off-loaded position of the wheeled vehicle.
Figure 7B:
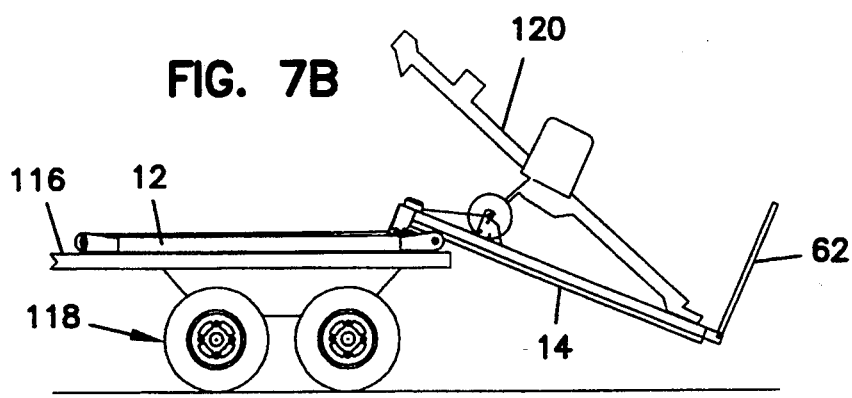
Figure 7C:
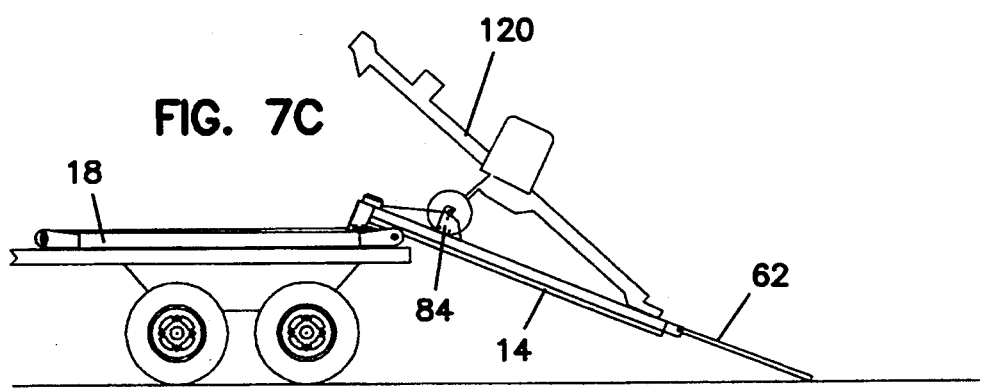

The operation of the self-loading ramp during a typical use is illustrated in FIGS. 7a–b. The self-loading ramp 10 is shown mounted on a bed 116 of a truck 118. An underground tunnelling rack 120 is illustrated in FIGS. 7a–c supported on the ramp assembly 14 with its axle held inside the latch assembly 84. Further, the cable 114 of the winch 112 is secured to the axle 86 (see FIG. 4a). The ramp assembly 14 is moved longitudinally rearwardly by operation of the hydraulic motor 40 and endless chain assembly as described above. As the ramp assembly 14 moves from the storage position illustrated in FIG. 7a to the rearwardly extended position illustrated in FIG. 7b, it progressively tips downwardly as the two support points, namely the rollers 16 and 18 at the forward end portion of the ramp assembly and the idler rollers 36 and 38 at the rearward end portion of the track assembly, move toward each other. The maximum rearwardly moved position of the ramp assembly 114 is illustrated in FIG. 7b.

Figure 7D:
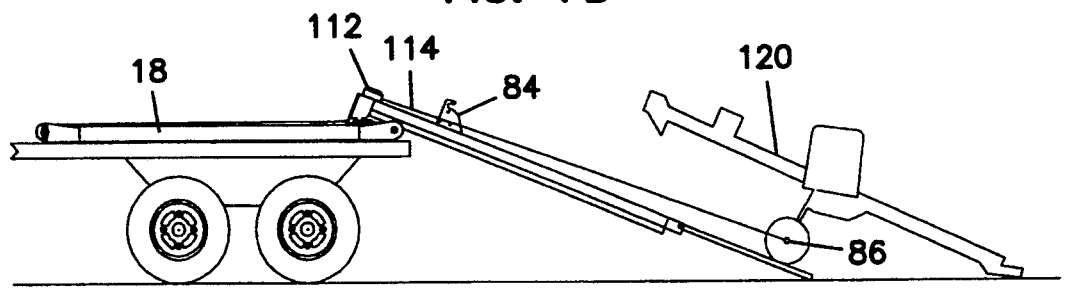

Once the ramp assembly 14 has been moved to its maximum rearwardly extended position, the ramp extension 62 is released and pivoted downwardly into contact with the ground (FIG. 7c). The latch assembly 84 is then released from the axle 86 of the underground tunnelling rack 120. The electric winch 112 is then operated to allow the tunnelling rack 120 to descend the ramp assembly 14 in a controlled fashion until it reaches a ground-supported position which is being neared in the illustration of FIG. 7d. Loading of the underground tunnelling rack from a ground-supported position to a storage or transport position is accomplished by reversing the steps described above.

Although the invention has been described with respect to a preferred embodiment thereof, it is to be also understood that it is not to be so limited since changes and modifications can be made therein which are within the full intended scope of this invention as defined by the appended claims.

I claim:

1. A ramp for loading and unloading a vehicle, comprising:
   (a) an elevated track assembly;
   (b) a ramp assembly mounted for longitudinal movement on said track assembly between a forward, transport position atop said track assembly and an operating position extended rearwardly and downwardly from said track assembly;

(c) means for moving said ramp assembly between said transport and operating position;

(d) means associated with said ramp assembly for moving the vehicle between a ramp-supported position and ground-supported position when said ramp assembly is in said operating position;

said ramp having wheel support surfaces extending substantially an entire length of said ramp;

said track assembly containing motive power means and a movable track extending a length of said assembly;

said ramp coupled to said track assembly for sliding movement thereon and said ramp coupled to said track for said ramp to be urged by said track to slide on said assembly.

2. A self-loading ramp as defined in claim 1, wherein said ramp assembly has a forward end portion constrained for longitudinal movement in said track assembly.

3. A self-loading ramp as defined in claim 1, wherein the vehicle is releasably secured to said ramp assembly.

* * * * *